Nov. 3, 1925.                                                          1,559,555
J. E. CROWN ET AL
KAFFIR CORN FEEDING AND HEADING MACHINE
Filed Dec. 10, 1923     3 Sheets-Sheet 3
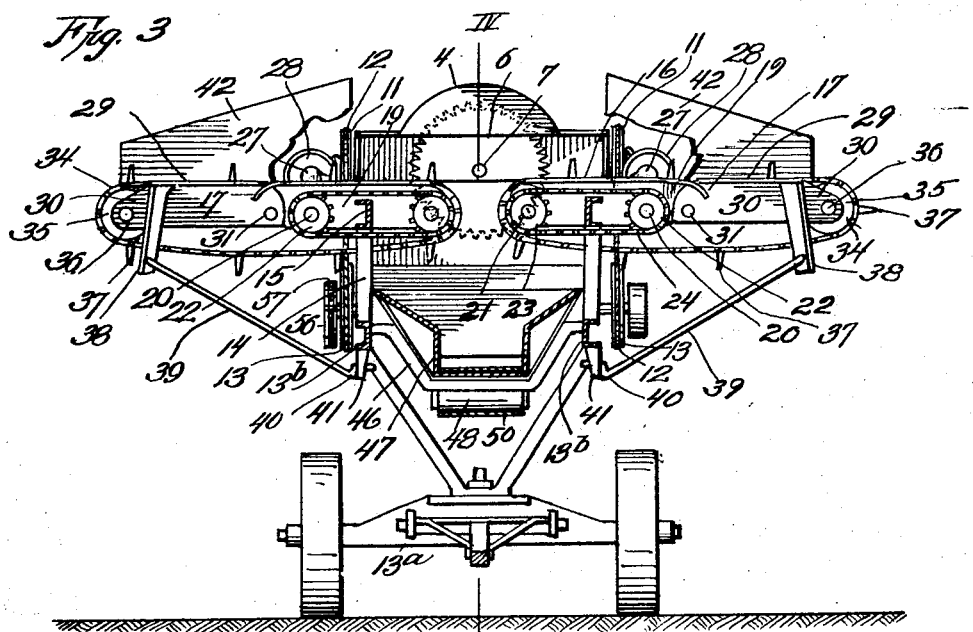

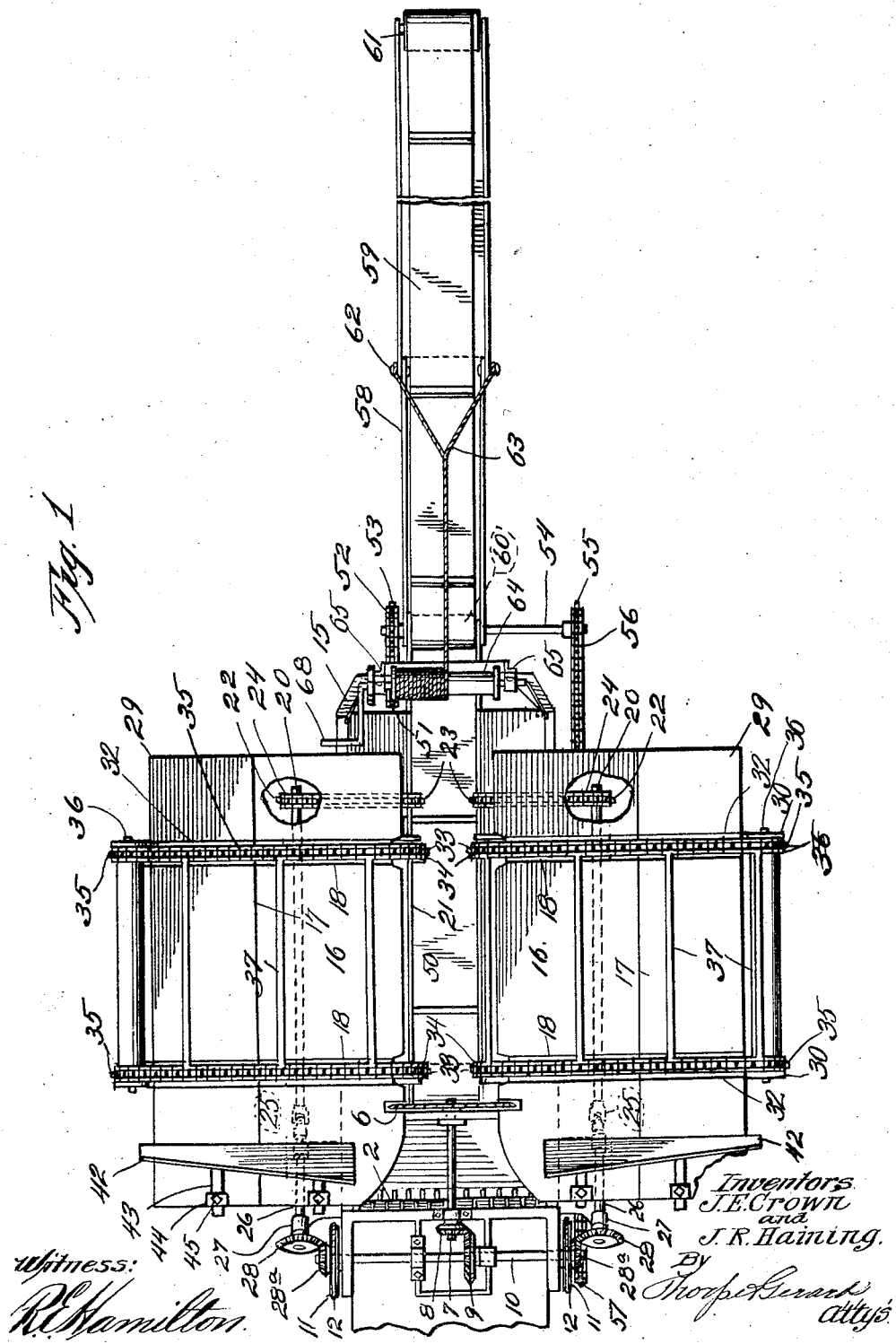

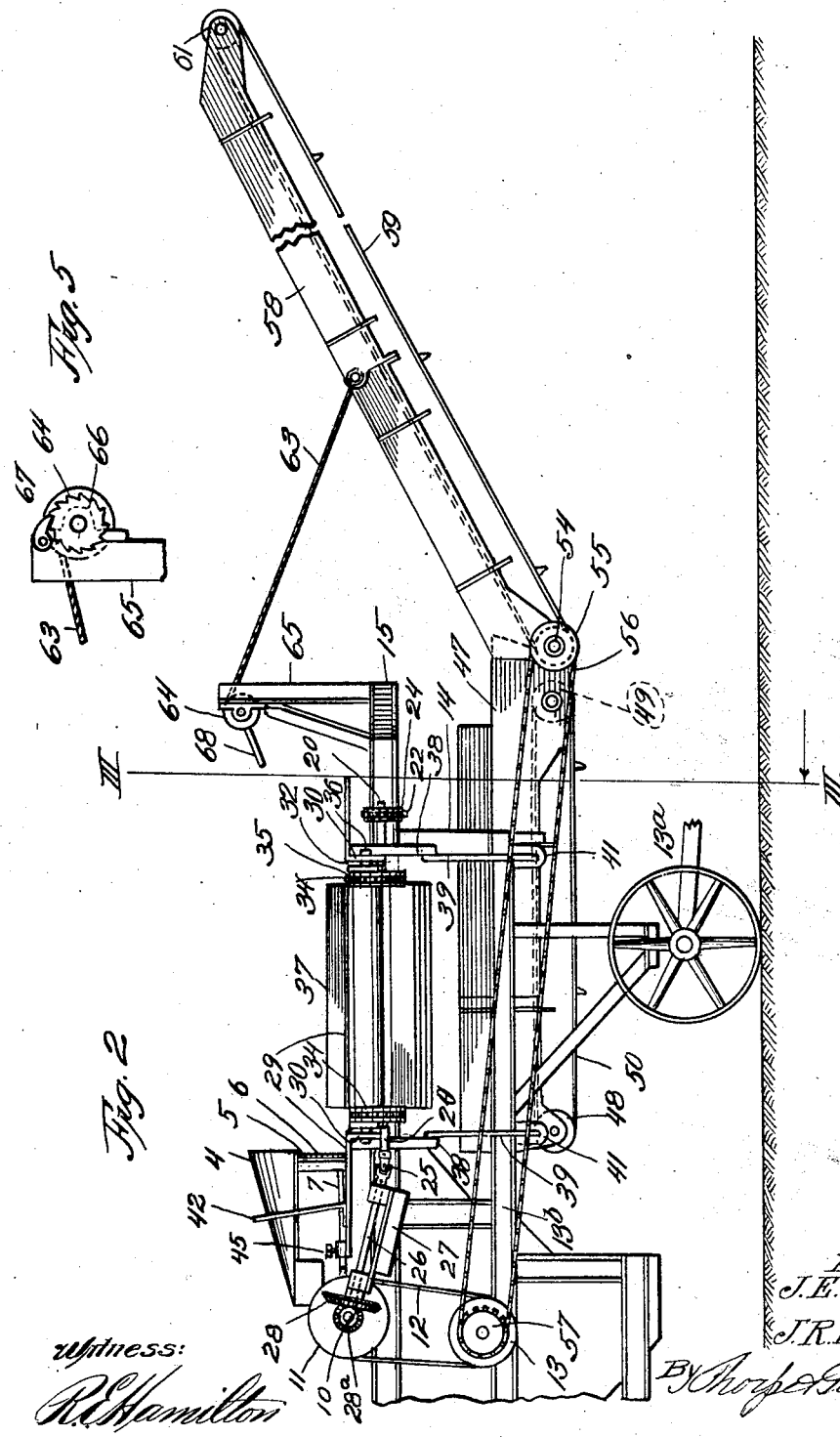

Patented Nov. 3, 1925.

1,559,555

UNITED STATES PATENT OFFICE.

JOSEPH E. CROWN AND JOHN R. HAINING, OF AGRA, KANSAS, ASSIGNORS OF ONE-THIRD TO W. C. WHITNEY, OF AGRA, KANSAS.

KAFIR-CORN FEEDING AND HEADING MACHINE.

Application filed December 10, 1923. Serial No. 679,635.

*To all whom it may concern:*

Be it known that we, JOSEPH E. CROWN and JOHN R. HAINING, citizens of the United States, and residents of Agra, county of Phillips, State of Kansas, have invented a certain new and useful Improvement in Kafir-Corn Feeding and Heading Machines, of which the following is a complete specification.

This invention relates to corn feeding and heading machines and the prime object, more especially, is to produce a machine of this character for severing and threshing the heads and stacking the stalks of kafir corn. Another object is to provide a machine for attachment to a threshing machine to cut the heads from the stalks fed to the machine so that the heads shall fall within the sphere of action of the threshing cylinder and the stalks upon a conveyor for stacking or making other disposition of them, as, for example, loading them onto a wagon for transportation to any desired point.

A further object is to provide a machine of this character which will operate efficiently and possesses the requisite qualities of simplicity, strength and durability, and can be secured in or removed from operative relation to a threshing machine by unskilled labor.

With these general objects in view the invention consists in certain novel and useful features of construction and combinations of parts as hereinafter described and claimed; and in order that it may be fully understood, reference is to be had to the accompanying drawings, in which:

Figure 1 is a plan view of apparatus embodying the invention, as applied to a conventional type separator.

Figure 2 is a side elevation of the same.

Figure 3 is a vertical cross section on the line III—III of Figure 2.

Figure 4 is a central vertical longitudinal section.

Figure 5 is a detail side elevation of features not otherwise clearly disclosed.

Referring now to the drawings in detail, where like reference characters identify corresponding parts in all of the figures, 1 indicates the front portion of a threshing machine or separator and 2 the cylinder thereof, access to the cylinder being by way of the opening 3, bridged by a hood guard 4. The lower part of the front wall of the guard is provided with an opening or mouth 5, and said mouth has rearward extensions formed in the side walls of the hood. A rotary cutter 6, occupying a position within the hood and opening 3, and located by preference near the front wall of the hood, is mounted upon a longitudinal shaft 7 suitably journaled, and equipped with a bevel gear 8 meshing with a bevel gear 9 on a transverse shaft 10 journaled in any suitable manner and projecting at its ends beyond the side walls of the hood, at which point it is equipped with grooved wheels 11 connected by belts 12 with grooved wheels 13 secured upon the ends of the shaft of the cylinder 2, the connections described serving to transmit power from the cylinder to the rotary cutter.

A wheeled truck 13$^a$ cooperates with the customary front wheels (not shown) of the threshing machine in supporting the front end of the latter, and also forms the support for the attachment, which in practice is adapted to be built on the front end of the threshing machine or to be detachably secured thereto. As shown the frame bars 13$^b$ form a continuation of corresponding bars of the threshing machine or separator and are mounted directly upon the wheeled truck, and rising from the bars 13$^b$ at a suitable point for stability, are standards 14, for the support of the front portion of the extension 15, of the threshing machine or separator, this extension like the bars 13$^b$ being preferably detachably secured to and forming a continuation of the separator. For convenience of illustration the parts 13$^b$ and 15, appear as integral extensions of the separator, as will be noted by reference particularly to Figure 2.

The skeleton frame described, is provided at opposite sides of its longitudinal center with stationary feed-table sections 16, in length substantially equal to the length of kafir corn when cut. The tables extend preferably from the front end of the thresher or separator, where they are notched to accommodate the cutting wheel 6, nearly to the rear end of the frame 15, and the outer side margins of said table sections preferably curve downwardly as at 17, for a purpose which hereinafter appears. The table sections are also preferably provided with transverse channels 18 in their upper sides, and with depending transverse stiffening ribs 19, just outward of said channels, said ribs being rigidly secured in any suitable manner to the side bars of the portion 15 of the framework. A pair of longitudinal shafts 20 are journaled in the outer ends of ribs 19, and a similar pair of longitudinal shafts 21 are journaled in the inner ends of said ribs. Sprocket wheels 22 are secured on shafts 20, and corresponding sprocket wheels 23 on shafts 21, and the pairs of sprocket wheels of each table, are connected by sprocket chains 24, for transmitting power from shafts 20 to shafts 21. The rear ends of shafts 20 are connected by universal joints 25, with shafts 26, journaled in brackets 27, secured to the sides of the separator, and said shafts 26 are equipped at their rear ends with beveled gears 28 meshing with small beveled gears 28$^a$ on the outer ends of shaft 10, the arrangement being such that power transmitted to shaft 10 from the cylinder, is in turn transmitted to the shafts 20, and thence to shaft 21, as above stated.

The table sections 16 are provided with lateral extensions 29 adapted, when not in use, to extend vertically downward to be out of the way when not in use or when the machine is stored or being transported. The sections 29 are provided like sections 16, with transverse ribs 30, and said ribs extend through notches in the curved edges 17 of section 16 and are pivoted to ribs 19 as at 31. The foldable sections 29 like sections 16, are provided with transverse grooves in their upper sides, these grooves indicated at 32, forming a continuation of grooves 18, when said foldable sections occupy their horizontal operative positions. At the inner edges of sections 16 sprocket wheels 33 are rigidly mounted on shafts 21, and said sprocket wheels are connected by sprocket chains 34 with sprocket wheels 35 mounted on longitudinal shafts 36 journaled in the outer ends of ribs 30, it being noted that the upper portions of the chains travel in the channels 18 and 32 of the sections 16 and 29 respectively. The chains are connected at suitable intervals by cleats or bars 37, which feed stalks of kafir corn or the like, placed longitudinally upon the table extensions, inwardly until they are brought into contact with the rotary cutter 6, which serves to sever the heads from the stalks so that the former shall fall through the opening 3 to the cylinder where they are threshed, and the stalks shall be discharged forward into the space between the table sections 16. The chains 34, with their connecting bars or cleats 37, thus constitute endless feeders or conveyors, and it will be noted in this connection that the downwardly-moving teeth of the cutting wheel utilize the adjacent table section 16 as a resistance point to cut the heads from the stalks, whereas on the opposite side, the upwardly-moving teeth utilize the hood for the same purpose.

To secure the table extensions 29 in their horizontal positions, they are provided near their outer ends with depending arms 38, to which are pivotally attached braces 39, having off-set arms 40 engaging apertured lugs 41 depending from the side bars 13$^b$. The disconnection of the off-set ends from the lugs 41, permit the extensions to swing downward to vertically pendant positions, and the flexible conveyors 34, described, accommodate this adjustment.

As guides for the proper placement of the stalks upon the tables, transverse abutment bars 42 are mounted upon the table transversely in a plane rearward of the cutting wheel, and said bars are provided with arms 43 extending through keepers 44 equipped with set screws 45, the latter impinging upon the arms 43 to secure the abutment bars firmly at the desired points of adjustment. It is necessary to adjust bars 42 to accommodate corn having heads of different length, that is to say, the corn in some fields may have much longer heads than in others and the abutment bars are therefore set to accommodate such differences.

At suitable points U-shaped hangers 46 connect the side bars 13$^b$, and form a support for a longitudinal hopper 47 underlying the space between the stationary tables. At the rear end and near the front end respectively, of the hopper, are journaled rollers 48 and 49, connected by an endless slatted conveyor 50, which forms the bottom of the hopper. A sprocket wheel 51 on the shaft of roller 49, is connected by a sprocket chain 52 with a sprocket wheel 53 on a parallel shaft 54 journaled in the front end of the hopper, and secured on the other end of said shaft is a sprocket wheel 55, connected by sprocket chain 56, to a sprocket wheel 57, on the corresponding end of the shaft of the cylinder of the separator, so that power from the latter shall be transmitted to shaft 54, and through sprocket chain 52, to the roller 49 of conveyor 50, to impart proper travel to the latter to feed the stalks dropping down upon it, in a forward direction and into an inclined elevator 58 provided with an elevating conveyor 59 for carrying up the stalks and stacking them or discharging them into a suitable vehicle (not shown). The conveyor 59 is in the form of a flexible belt provided with cross slats, and is mounted at its rear end on a drive roller 60 on shaft 54, and at its front end on a roller 61. For convenience of storage and the like, the elevator frame is made in two sections pivoted together at 62 to permit of folding, and a forked cable 63 is secured to the elevator and to a drum 64, journaled in standards 65 mounted on the front end of frame 15. The drum is provided at one end with a ratchet wheel 66 engaged by a gravity pawl 67 (see Figure 5) to prevent accidental unwinding of the cable and downward movement of the elevator frame, and the drum shaft is provided with a crank handle 68 whereby the cable may be wound upon the drum for the purpose of elevating the elevator to the desired position of adjustment.

Assuming that the parts are arranged as shown and that threshing cylinder is in operation, it will be seen that corn placed on either table extension or both of them, with the heads adjacent the abutment boards, will be converged inwardly and laterally against the cutting wheel, whereby the heads will be severed and drop down through the opening 3 to the threshing cylinder. At the same time the stalks will be discharged from the inner edges of the tables by the conveying means, and fall into the underlying hopper upon the conveyor bottom thereof. From this conveyor they will be passed to the inclined conveyor and discharged thereby to form a stack or onto a suitable vehicle, for transportation to any desired point.

From the foregoing it will be apparent that we have produced a machine of the character described, possessing the features of advantage set forth in the statement of the object of the invention, and which is susceptible of modification in various particulars without departing from the principle of construction and mode of operation involved or from the spirit and scope of the appended claims.

We claim:

1. The combination with a machine having threshing mechanism at its front end and a hood overlying such mechanism and provided with a mouth at its front end, of a rotary cutter bridging such mouth and in shearing relation to the upper and lower edges thereof, and a pair of inwardly travelling side conveyors adjacent and spaced apart at their inner ends a distance less than the diameter and terminating at opposite sides of the axial plane of the cutter; said hood having side extensions for its mouth to permit the heads of grain carried to opposite edges of the cutter by the conveyors, to enter the hood.

2. The combination with a machine having threshing mechanism at its front end and a hood overlying such mechanism and provided with a mouth at its front end, of a rotary cutter bridging such mouth and in shearing relation to the upper and lower edges thereof, a pair of inwardly traveling side conveyors adjacent and spaced apart at their inner ends a distance less than the diameter and terminating at opposite sides of the axial plane of the cutter; said hood having side extensions for its mouth to permit the heads of grain carried to opposite edges of the cutter by the conveyors, to enter the hood, the conveyors being jointed and their outer portions adapted to swing downward to a pendant position, and means for bracing them in their operative or elevated positions.

3. The combination with a threshing machine, having an extension framework at its threshing end, and a wheel support at such end, of a hood over the threshing end provided at its front end with a mouth, a cutter operable to sever grain stalks extending longitudinally of the machine, and in shearing relation to the latter and the hood, laterally travelling conveyors to carry headed grain to opposite side edges of the cutter, the hood having mouth extensions to permit the headed ends of the grain to enter and lie within the hood as the stalks are cut when brought against the cutter, a longitudinal hopper underlying the inner end of the conveyors for catching the stalks after the beheading thereof and their discharge from the inner ends of the conveyors, a forwardly-traveling conveyor at the bottom of the hopper, and a forwardly-traveling upwardly-inclined elevator to receive the stalks from the last-named conveyor for stacking purposes.

4. The combination with a machine having threshing mechanism at its front end and a hood overlying such mechanism and provided with a mouth at its front end, of a rotary cutter bridging such mouth and in shearing relation to the upper and lower edges thereof, a pair of substantially horizontal tables in a plane intersecting that of the cutter and spaced apart a distance less than the diameter of the cutter and extending longitudinally from a plane rearward of that of the cutter to a plane forward thereof a distance equal to the length of maximum growth grain to be headed, said tables comprising inner stationary sections, and outer sections hinged to the inner sections, demountable braces for holding the outer sections elevated to operative position, transverse grain-head abutment bars on the tables at opposite sides of said hood, and endless flexible conveyors on the tables and foldable with the outer sections thereof and disposed forward of the plane of action of the cutter to feed headed grain sidewise on the tables to opposite edges of the cutter.

In witness whereof we hereunto affix our signatures.

JOSEPH E. CROWN.
JOHN R. HAINING.